US012669834B2

(12) United States Patent
Zhang

(10) Patent No.: US 12,669,834 B2
(45) Date of Patent: Jun. 30, 2026

(54) VIDEO CAPTURING METHOD AND APPARATUS USING UNMANNED AERIAL VEHICLE, UNMANNED AERIAL VEHICLE AND STORAGE MEDIUM

(71) Applicant: AUTEL ROBOTICS CO., LTD., Shenzhen (CN)

(72) Inventor: Yucheng Zhang, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 103 days.

(21) Appl. No.: 18/607,936

(22) Filed: Mar. 18, 2024

(65) Prior Publication Data

US 2024/0219930 A1    Jul. 4, 2024

Related U.S. Application Data

(63) Continuation of application No. PCT/CN2022/119235, filed on Sep. 16, 2022.

(30) Foreign Application Priority Data

Sep. 17, 2021    (CN) .......................... 202111094798.7

(51) Int. Cl.
*G05D 1/689* (2024.01)
*B64U 20/87* (2023.01)
(Continued)

(52) U.S. Cl.
CPC ............. *G05D 1/689* (2024.01); *B64U 20/87* (2023.01); *G05D 1/49* (2024.01); *H04N 23/695* (2023.01);
(Continued)

(58) Field of Classification Search
CPC ...... G05D 1/689; G05D 1/49; G05D 2105/80; G05D 2109/20; G05D 1/101; B64U 20/87;
(Continued)

(56) References Cited

U.S. PATENT DOCUMENTS 8,946,606 B1 * 2/2015 Dennison .............. F41G 7/2293
382/103
2018/0135798 A1 * 5/2018 Griffin ..................... G05B 6/02
(Continued)

FOREIGN PATENT DOCUMENTS

CN    107077154 A    8/2017
CN    108255198 A    7/2018
(Continued)

OTHER PUBLICATIONS

The International Search Report mailed Dec. 13, 2022; PCT/CN2022/119235 with English Translation.
(Continued)

*Primary Examiner* — Tyler D Paige
(74) *Attorney, Agent, or Firm* — Frank Gao, Esq.

(57) ABSTRACT

Disclosed are a video capturing method and apparatus using an unmanned aerial vehicle, an unmanned aerial vehicle and a storage medium. The method includes: determining a rotation speed of a gimbal according to a target flight distance of the unmanned aerial vehicle and a target rotation angle of the gimbal; determining an initial rotation angle of the gimbal according to a rotation direction and the target rotation angle of the gimbal, and controlling the gimbal to rotate from a current rotation angle to the initial rotation angle; and capturing a video of a target object from the initial rotation angle to the target rotation angle according to a
(Continued)

flight direction and the target flight distance of the unmanned aerial vehicle, and the rotation speed and the rotation direction of the gimbal.

20 Claims, 3 Drawing Sheets

(51) Int. Cl.

| | |
|---|---|
| *B64U 101/30* | (2023.01) |
| *G05D 1/49* | (2024.01) |
| *H04N 23/695* | (2023.01) |
| *G05D 105/80* | (2024.01) |

(52) U.S. Cl.
CPC ..... *B64U 2101/30* (2023.01); *G05D 2105/80* (2024.01)

(58) Field of Classification Search
CPC ... B64U 2101/30; H04N 23/695; H04N 23/60
USPC ............................................................. 701/3
See application file for complete search history.

(56)  References Cited

U.S. PATENT DOCUMENTS

2019/0084675 A1*   3/2019   Qu ....................... G03B 15/006

2019/0138030 A1*   5/2019   Wu ................... G06K 19/06037
2019/0304105 A1*   10/2019   Gao ..................... G06V 10/255

FOREIGN PATENT DOCUMENTS

| | | |
|---|---|---|
| CN | 108476288 A | 8/2018 |
| CN | 109062251 A | 12/2018 |
| CN | 109660721 A | 4/2019 |
| CN | 109960281 A | 7/2019 |
| CN | 110083174 A | 8/2019 |
| CN | 110083180 A | 8/2019 |
| CN | 111142580 A | 5/2020 |
| CN | 111665870 A | 9/2020 |
| CN | 211878727 U | 11/2020 |
| CN | 112653843 A | 4/2021 |
| CN | 112887592 A | 6/2021 |
| CN | 113163118 A | 7/2021 |
| CN | 113170055 A | 7/2021 |
| CN | 113805607 A | 12/2021 |
| JP | 2005130007 A | 5/2005 |

OTHER PUBLICATIONS

The First Chinese Office Action dated Oct. 23, 2023; Appln. No. 202111094798.7 with English Translation.

* cited by examiner

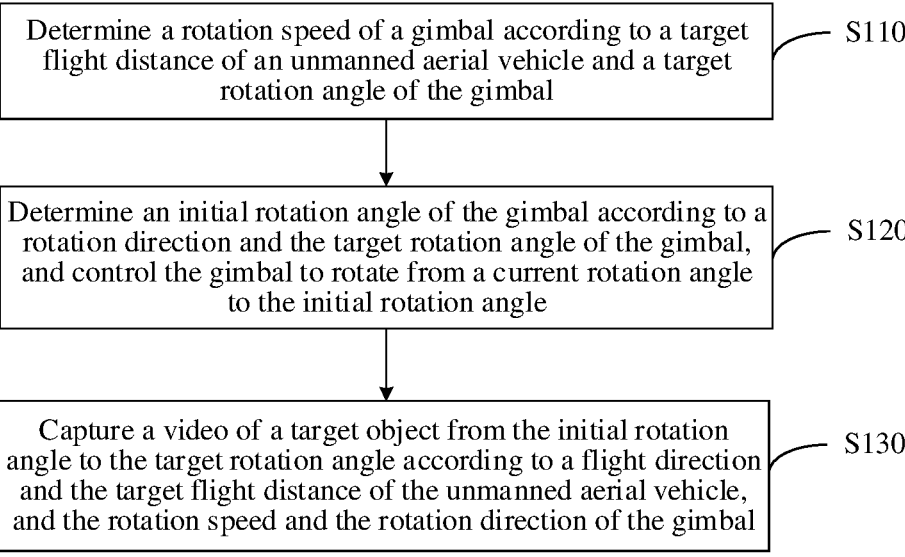

Determine a rotation speed of a gimbal according to a target flight distance of an unmanned aerial vehicle and a target rotation angle of the gimbal ⟍ S110

Determine an initial rotation angle of the gimbal according to a rotation direction and the target rotation angle of the gimbal, and control the gimbal to rotate from a current rotation angle to the initial rotation angle ⟍ S120

Capture a video of a target object from the initial rotation angle to the target rotation angle according to a flight direction and the target flight distance of the unmanned aerial vehicle, and the rotation speed and the rotation direction of the gimbal ⟍ S130

FIG. 1

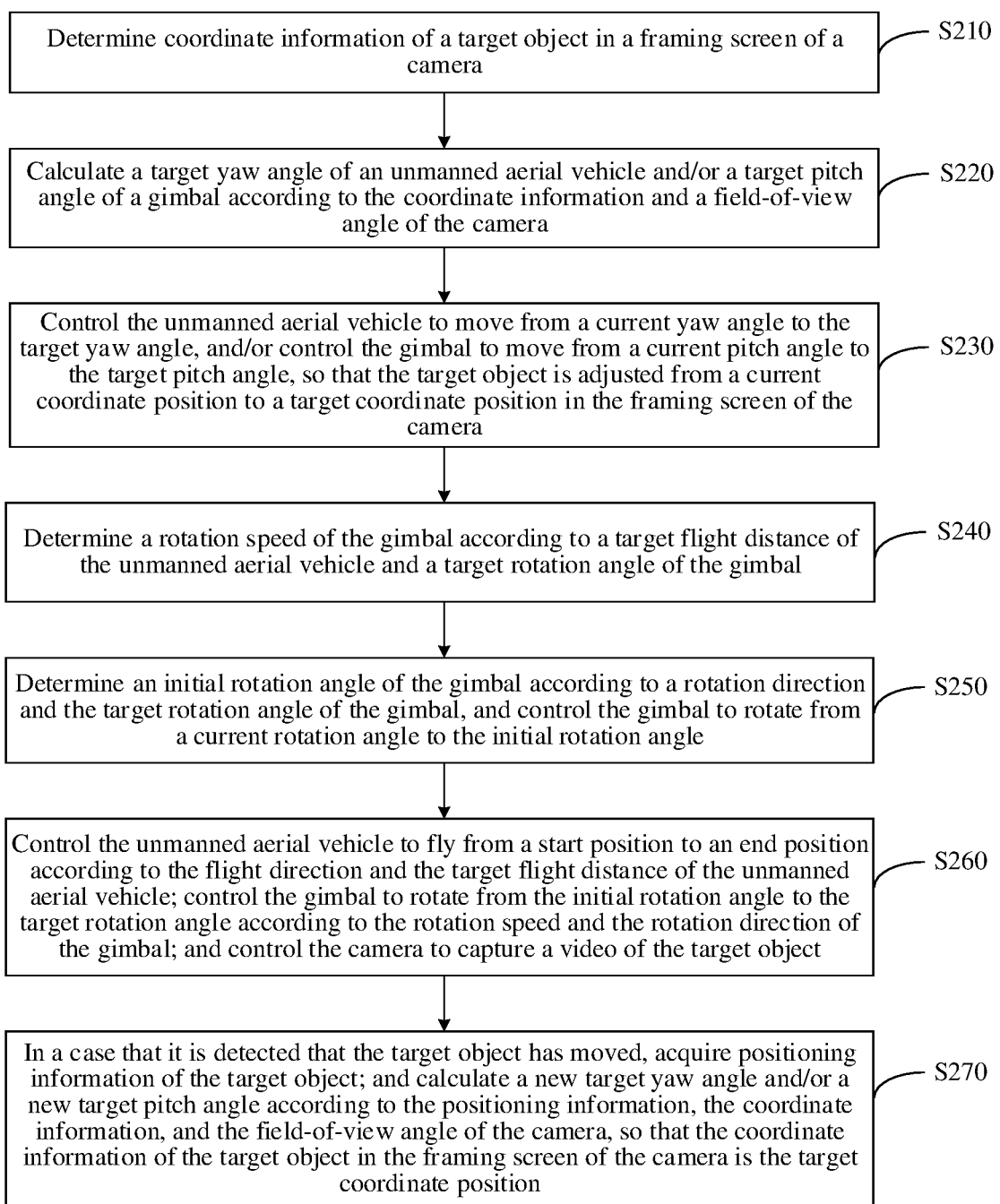

Determine coordinate information of a target object in a framing screen of a camera — S210

Calculate a target yaw angle of an unmanned aerial vehicle and/or a target pitch angle of a gimbal according to the coordinate information and a field-of-view angle of the camera — S220

Control the unmanned aerial vehicle to move from a current yaw angle to the target yaw angle, and/or control the gimbal to move from a current pitch angle to the target pitch angle, so that the target object is adjusted from a current coordinate position to a target coordinate position in the framing screen of the camera — S230

Determine a rotation speed of the gimbal according to a target flight distance of the unmanned aerial vehicle and a target rotation angle of the gimbal — S240

Determine an initial rotation angle of the gimbal according to a rotation direction and the target rotation angle of the gimbal, and control the gimbal to rotate from a current rotation angle to the initial rotation angle — S250

Control the unmanned aerial vehicle to fly from a start position to an end position according to the flight direction and the target flight distance of the unmanned aerial vehicle; control the gimbal to rotate from the initial rotation angle to the target rotation angle according to the rotation speed and the rotation direction of the gimbal; and control the camera to capture a video of the target object — S260

In a case that it is detected that the target object has moved, acquire positioning information of the target object; and calculate a new target yaw angle and/or a new target pitch angle according to the positioning information, the coordinate information, and the field-of-view angle of the camera, so that the coordinate information of the target object in the framing screen of the camera is the target coordinate position — S270

FIG. 2

VIDEO CAPTURING METHOD AND APPARATUS USING UNMANNED AERIAL VEHICLE, UNMANNED AERIAL VEHICLE AND STORAGE MEDIUM

CROSS-REFERENCE TO RELATED APPLICATIONS

This application is a Continuation Application of the International Application No. PCT/CN2022//119235 file on Sep. 16, 2022, which claims priority to Chinese Patent Application No. 2021110947987, titled "VIDEO CAPTURING METHOD AND APPARATUS USING UNMANNED AERIAL VEHICLE, UNMANNED AERIAL VEHICLE AND STORAGE MEDIUM" and filed on Sep. 17, 2021, which is incorporated herein by reference in its entirety.

BACKGROUND

In recent years, unmanned aerial vehicles have been used to track targets to capture videos. In the related art, capturing a camera-rotated video usually includes controlling a pitch angle and a roll angle of a gimbal and a yaw angle of an unmanned aerial vehicle simultaneously through a joystick or a remote control handle, and rotating the yaw angle of the unmanned aerial vehicle when looking down at the gimbal, so that the effect of camera rotation can be achieved. However, the difficulty in operating the unmanned aerial vehicle in the related art is very great, and the effect of the camera-rotated video captured is not good since the roll angle of the gimbal cannot be accurately controlled for a long time during video capture.

SUMMARY

Embodiments of the present application relate to the technical field of unmanned aerial vehicles, and in particular to a video capturing method and apparatus using an unmanned aerial vehicle, an unmanned aerial vehicle and a storage medium Embodiments of the present application provide a video capturing method and apparatus using an unmanned aerial vehicle, an unmanned aerial vehicle and a storage medium, by which the difficulty in capturing a camera-rotated video can be reduced, and the effect of capturing a camera-rotated video can be improved.

According to a first aspect, an embodiment of the present application provides a video capturing method using an unmanned aerial vehicle applied to a video capturing system using an unmanned aerial vehicle, the system including an unmanned aerial vehicle, the unmanned aerial vehicle being provided with a gimbal, and the method including:

determining a rotation speed of the gimbal according to a target flight distance of the unmanned aerial vehicle and a target rotation angle of the gimbal;

determining an initial rotation angle of the gimbal according to a rotation direction and the target rotation angle of the gimbal, and controlling the gimbal to rotate from a current rotation angle to the initial rotation angle; and capturing a video of a target object from the initial rotation angle to the target rotation angle according to a flight direction and the target flight distance of the unmanned aerial vehicle, and the rotation speed and the rotation direction of the gimbal.

According to a second aspect, an embodiment of the present application provides a video capturing apparatus using an unmanned aerial vehicle integrated into a video capturing system using an unmanned aerial vehicle, the system including an unmanned aerial vehicle, the unmanned aerial vehicle being provided with a gimbal, and the apparatus including:

a speed determination module configured to determine a rotation speed of the gimbal according to a target flight distance of the unmanned aerial vehicle and a target rotation angle of the gimbal;

an angle control module configured to determine an initial rotation angle of the gimbal according to a rotation direction and the target rotation angle of the gimbal, and control the gimbal to rotate from a current rotation angle to the initial rotation angle; and a video capture control module configured to capture a video of a target object from the initial rotation angle to the target rotation angle according to a flight direction and the target flight distance of the unmanned aerial vehicle, and the rotation speed and the rotation direction of the gimbal.

According to a third aspect, an embodiment of the present application provides an unmanned aerial vehicle, including:

one or more processors; and a memory device configured to store one or more programs, the one or more programs, when executed by the one or more processors, causing the one or more processors to implement the video capturing method using an unmanned aerial vehicle according to any embodiment of the present application.

According to a fourth aspect, an embodiment of the present application provides a computer-readable storage medium storing a computer program, the computer program, when executed by a processor, implementing the video capturing method using an unmanned aerial vehicle according to any embodiment of the present application.

It is to be understood that the content described herein is not intended to identify key or important features of the embodiments of the present application, nor is it intended to limit the scope of protection of the present application. Other features of the present application will be easily understood through the following description.

BRIEF DESCRIPTION OF THE DRAWINGS

The drawings are intended to better understand the present application and do not constitute limitations on the present application. In the drawings:

FIG. 1 is a first flowchart of a video capturing method using an unmanned aerial vehicle according to an embodiment of the present application.

FIG. 2 is a second flowchart of a video capturing method using an unmanned aerial vehicle according to an embodiment of the present application.

DETAILED DESCRIPTION

Figure 3:
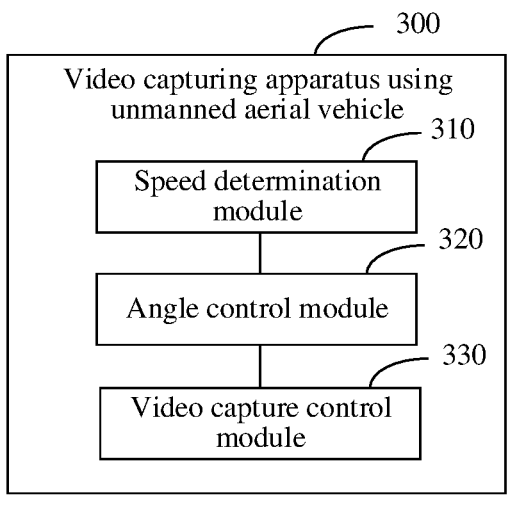
FIG. 3 is a schematic structural diagram of a video capturing apparatus using an unmanned aerial vehicle according to an embodiment of the present application.

To make the purposes, technical solutions and advantages of the embodiments of the present application clearer, the technical solutions in the embodiments of the present application will be clearly and completely described below with reference to the drawings in the embodiments of the present application. Apparently, the described embodiments are merely some rather than all of the embodiments of the present application. All other embodiments obtained by those skilled in the art based on the embodiments of the present application without contributing any inventive labor shall still fall within the scope of protection of the present application.

Before the embodiments of the present application are introduced, it is to be understood that, the video capturing method using an unmanned aerial vehicle in the present application is applied to a video capturing system using an unmanned aerial vehicle. The system includes an unmanned aerial vehicle, a gimbal, and a camera. The gimbal is a mechanical component mounted on the unmanned aerial vehicle to mount the camera, and the unmanned aerial vehicle is provided with a controller. The controller can control and adjust the yaw angle of the unmanned aerial vehicle and the pitch angle of the gimbal, can control the unmanned aerial vehicle to fly from the start position to the end position according to the flight direction and the target flight distance, can control the gimbal to rotate from the initial rotation angle to the target rotation angle according to the rotation speed and the rotation direction, and can control the camera to capture a video of the target object. A mobile terminal is a device configured for a user to transmit an instruction of controlling the unmanned aerial vehicle to capture a video to the controller.

It is to be understood that, the user and the target object in embodiments may be the same person or not the same person. In the case of the same person, it is a scenario where the user uses the unmanned aerial vehicle to capture a video of his own through camera rotation. In the case of not the same person, it is a scenario where the user uses the unmanned aerial vehicle to capture a video of the target object through camera rotation. The target object in embodiments may be a person or an object, such as a ship or a building. The target object in embodiments may be at least one target object, i.e., multiple persons or multiple objects. Next, the video capturing method using an unmanned aerial vehicle will be explained and described in detail.

Embodiment 1

FIG. 1 is a first flowchart of a video capturing method using an unmanned aerial vehicle according to an embodiment of the present application. This embodiment is applicable to the situation where an unmanned aerial vehicle is used to capture a video of a target object through camera rotation, in order to obtain a camera-rotated video of the target object. The video capturing method using an unmanned aerial vehicle provided in this embodiment may be implemented by a video capturing apparatus using an unmanned aerial vehicle provided in an embodiment of the present application. The apparatus may be implemented by way of software and/or hardware and integrated into an electronic device executing the method. Preferably, the electronic device in this embodiment of the present application may be an unmanned aerial vehicle, and the unmanned aerial vehicle may be a quadcopter.

Referring to FIG. 1, the method in this embodiment includes, but not limited to, the following steps:

In S110, a rotation speed of a gimbal is determined according to a target flight distance of the unmanned aerial vehicle and a target rotation angle of the gimbal.

The target flight distance refers to a distance that the unmanned aerial vehicle needs to fly in the process of capturing a video of the target object through camera rotation. The target rotation angle refers to an angle at which the gimbal needs to rotate in the process of capturing a video of the target object through camera rotation. The rotation speed of the gimbal refers to a rotation speed of the gimbal in the process of capturing a video of the target object through camera rotation.

In this embodiment, preferably, the gimbal may be a four-axis gimbal. The characteristic of the four-axis gimbal is that the maximum limit of the roll angle of the gimbal is 830°, which can meet the requirement of users for capturing a video of the target object at a large rotation angle through camera rotation. It is to be understood that in this embodiment, a target video capture angle is less than or equal to the maximum limit of the roll angle of the gimbal.

Horizontal and vertical directions of the gimbal are driven by two different motors, so the rotation speed of the gimbal is divided into horizontal rotation speed and vertical rotation speed. In this embodiment of the present application, whether the rotation speed of the gimbal is horizontal rotation speed or vertical rotation speed is not specifically limited and distinguished. It is to be understood that in a case that the rotation speed of the gimbal is horizontal rotation speed, it is a scenario where the unmanned aerial vehicle is located over the target object to capture a video thereof through camera rotation. In a case that the rotation speed of the gimbal is vertical rotation speed, it is a scenario where the unmanned aerial vehicle is located in front of, behind, or at the left or right of the target object to capture a video thereof through camera rotation.

In this embodiment of the present application, the user inputs the target flight distance and the target rotation angle through a mobile terminal. After receiving the target flight distance and the target rotation angle inputted by the user, the controller calculates the rotation speed of the gimbal according to a preset calculation method. The preset calculation method in the present application may be to use a formula for calculating the rotation speed of the gimbal in the related art.

More preferably, after receiving the target rotation angle inputted by the user, the controller further needs to determine whether the target rotation angle is greater than the maximum limit of the roll angle of the gimbal. In a case that the target rotation angle is greater than the maximum limit of the roll angle of the gimbal, the controller transmits a warning message to the user to remind the user that the target rotation angle does not meet a preset requirement.

In S120, an initial rotation angle of the gimbal is determined according to a rotation direction and the target rotation angle of the gimbal, and the gimbal is controlled to rotate from a current rotation angle to the initial rotation angle.

The rotation direction of the gimbal refers to a rotation direction of the gimbal in the process of capturing a video of the target object through camera rotation. The initial rotation angle refers to an angle at which the gimbal needs to start rotating from the roll angle of the gimbal in the process of capturing a video of the target object through camera rotation. The current rotation angle refers to an angle at which the gimbal is currently located at the roll angle of the gimbal before capturing a video of the target object through camera rotation. In the present application, the roll angle of the gimbal is marked starting from 0°, and the maximum angle is a limit position of the roll angle of the gimbal.

In this embodiment of the present application, the user inputs the rotation direction of the gimbal through a mobile terminal. After receiving the rotation direction of the gimbal inputted by the user, the controller determines the initial rotation angle of the gimbal according to the rotation direction and the target rotation angle of the gimbal.

Specifically, there are two methods to determine the initial rotation angle. Method 1: after the rotation direction of the gimbal inputted by the user is received, the initial rotation angle of the gimbal is directly determined as a limit position (i.e., 0°) in an opposite direction corresponding to the rotation direction of the gimbal. Method 2: after the rotation direction of the gimbal inputted by the user is received, a difference between the current rotation angle and the target rotation angle of the gimbal is calculated according to the rotation direction of the gimbal, thereby obtaining the initial rotation angle, that is, the initial rotation angle is not the limit position (i.e., 0°). Exemplarily, in a case that the roll angle of the gimbal is marked from 0° (the maximum roll angle is set to be 830°), the current rotation angle of the gimbal (i.e., the roll angle of the gimbal) is 800°, the target rotation angle is 600 and the rotation direction of the gimbal is counterclockwise, it is necessary to rotate the gimbal clockwise from the current rotation angle for 300 (that is, the roll angle of the gimbal is 770°). In other words, the gimbal is rotated anticlockwise from the roll angle of 770° (i.e., the initial rotation angle) to the roll angle of 830°, thereby meeting the requirement of rotating the gimbal for the target rotation angle of 60°. Further exemplarily, in a case that the current rotation angle of the gimbal is 770°, the target rotation angle is 600 and the rotation direction of the gimbal is counterclockwise, there is no need to rotate the gimbal, that is, the current rotation angle is the initial rotation angle, thereby meeting the requirement of rotating the gimbal for the target rotation angle of 60°.

Further, method 2 is superior to method 1 in determining the initial rotation angle, for reasons as follows: in a case that the target rotation angle is a small angle, compared with method 1, which directly determines the initial rotation angle as the limit position in the opposite direction corresponding to the rotation direction of the gimbal, method 2 calculates the initial rotation angle according to the rotation direction and the target rotation angle of the gimbal, which can avoid rotating the gimbal for a very large angle to the initial rotation angle, avoid damage to the mechanical rotating components of the gimbal, and make it more intelligent. Therefore, preferably, the method of determining the initial rotation angle adopted in the present application is method 2.

In S130, a video of a target object is captured from the initial rotation angle to the target rotation angle according to a flight direction and the target flight distance of the unmanned aerial vehicle, and the rotation speed and the rotation direction of the gimbal.

The flight direction of the unmanned aerial vehicle includes a direction of getting close to or far away from the target object.

In this embodiment of the present application, after the rotation speed and the initial rotation angle of the gimbal are determined through the above steps, in combination with the flight direction, the target flight distance, and the rotation direction of the gimbal inputted by the user through the mobile terminal, a video of the target object is captured from the initial rotation angle to the target rotation angle to obtain a camera-rotated video of the target object.

Specifically, a process of capturing a video of the target object through camera rotation includes: controlling the unmanned aerial vehicle to fly from a start position to an end position according to the flight direction and the target flight distance of the unmanned aerial vehicle; controlling the gimbal to rotate from the initial rotation angle to the target rotation angle according to the rotation speed and the rotation direction of the gimbal; and controlling the camera to capture a video of the target object.

In this embodiment of the present application, in a case that the target object does not move, a flight route of the unmanned aerial vehicle can be determined according to the flight direction and the target flight distance of the unmanned aerial vehicle, that is, the flight route does not change. In a process that the unmanned aerial vehicle flies along the flight route from the start position to the end position, the gimbal continuously rotates from the initial rotation angle to the target rotation angle according to the rotation speed and the rotation direction of the gimbal, so that the camera in the gimbal captures a video of the target object through camera rotation. In a case that the target object has moved in the video capture process, the flight route of the unmanned aerial vehicle will also be changed correspondingly. The specific way to change the flight route of the unmanned aerial vehicle will be explained and described in detail in the following embodiment.

It is to be understood that, the pitch angle and the roll angle of the gimbal in this embodiment are independent of each other. In the process of capturing a video of the target object through camera rotation, it is necessary to change the roll angle of the gimbal to complete the video capture of the target object from the initial rotation angle to the target rotation angle. In the video capture process, the pitch angle of the gimbal may be changed or may not, be changed. In other words, the roll angle of the gimbal is not influenced by the pitch angle of the gimbal in the process of capturing a camera-rotated video. Whether to change the pitch angle of the gimbal depends on whether the target object has moved, that is, the purpose of changing the pitch angle of the gimbal is to track the target object. In a case that the target object has moved, it is necessary to change the pitch angle of the gimbal to make the coordinate information of the target object in the framing screen of the camera be the target coordinate position. The specific process will be explained and described in detail in the following embodiment.

Optionally, in a case that the controller detects that the target object is lost in the tracking and video capture process, the unmanned aerial vehicle may no longer track the target object and only needs to determine a current target yaw angle of the unmanned aerial vehicle, a current target pitch angle of the gimbal, and a position of the target object before being lost. An operation of capturing a video of the position of the target object before being lost from the initial rotation angle to the target rotation angle according to the flight direction and the target flight distance of the unmanned aerial vehicle, and the rotation speed and the rotation direction of the gimbal is continuously performed on the position of the target object before being lost according to the current target yaw angle of the unmanned aerial vehicle and the current target pitch angle of the gimbal.

More preferably, before the video of the target object is captured through camera rotation to obtain a camera-rotated video of the target object, the user may also input relevant video parameter information such as video duration and video capture interval through the mobile terminal, and may also input the flight speed of the unmanned aerial vehicle through the mobile terminal to obtain a camera-rotated video that makes the user more satisfied.

Optionally, in the present application, in the process of capturing a video of the target object, a delayed video capture function may also be used to capture a video of the target object, so as to compress a slow change process of the target object into a shorter time (preset time), thereby presenting a fantastic and exciting scene that cannot be observed by the naked eyes normally.

In the technical solution provided in this embodiment, firstly, the rotation speed of the gimbal is determined according to the target flight distance of the unmanned aerial vehicle and the target rotation angle of the gimbal; then, the initial rotation angle of the gimbal is determined according to the rotation direction and the target rotation angle of the gimbal, and the gimbal is controlled to rotate from the current rotation angle to the initial rotation angle; and finally, a video of the target object is captured from the initial rotation angle to the target rotation angle according to the flight direction and the target flight distance of the unmanned aerial vehicle, and the rotation speed and the rotation direction of the gimbal. The present application can automatically control the flight of the unmanned aerial vehicle and the rotation of the gimbal through the controller, thereby solving the problem of manual control of the unmanned aerial vehicle and the gimbal in the related art, and reducing the difficulty in capturing a camera-rotated video. The present application can accurately control the rotation angle and the rotation speed of the gimbal, thereby accurately controlling the roll angle of the gimbal. Therefore, the present application can also improve the effect of capturing a camera-rotated video.

Embodiment 2

FIG. 2 is a second flowchart of a video capturing method using an unmanned aerial vehicle according to an embodiment of the present application. This embodiment of the present application is optimized based on the above embodiment, and the specific optimization is as follows: in this embodiment, a process of tracking the target object before and during video capture is explained and described in detail.

Referring to FIG. 2, the method in this embodiment includes, but not limited to, the following steps: In S210, coordinate information of the target object in a framing screen of the camera is determined.

In this embodiment of the present application, the controller may control the gimbal to face to the target object, so that the target object appears in the framing screen of the camera, and then the controller needs to determine the coordinate information of the target object in the framing screen of the camera. The coordinate information refers to the 2D coordinate information of the target object in a camera coordinate system.

Optionally, a method that the controller controls the gimbal to face to the target object may be as follows: positioning information of the target object is acquired from the mobile terminal, and the yaw angle of the unmanned aerial vehicle is determined according to the positioning information to make the gimbal face to the target object, so that the camera can frame the target object.

A method of acquiring the positioning information of the target object may be as follows: in a case that the user and the target object are the same person, the positioning information of the mobile terminal is acquired, that is, the positioning information of the target object is acquired; and in a case that the user and the target object are not the same person, the user may input the positioning information of the target object in the mobile terminal, so that the controller can acquire the positioning information of the target object. Optionally, the target object may be provided with a positioning device, and the user may configure the controller in the mobile terminal to acquire the positioning information of the target object by acquiring the positioning information of the positioning device. The positioning information of the target object may also be acquired through other methods of acquiring positioning information in the related art.

A method of determining the yaw angle of the unmanned aerial vehicle according to the positioning information may be as follows: firstly, the straight-line distance between the unmanned aerial vehicle and the target object is determined, and then a rotation angle corresponding to the current yaw angle is calculated according to the current yaw angle of the unmanned aerial vehicle, so that after the current yaw angle of the unmanned aerial vehicle is changed for the rotation angle, the target object can appear in the framing screen of the camera.

In S220, a target yaw angle of the unmanned aerial vehicle and/or a target pitch angle of the gimbal are calculated according to the coordinate information and a field-of-view angle of the camera.

Since the gimbal is a mechanical component for mounting the camera, the pitch angle of the gimbal is the pitch angle of the camera.

In this embodiment of the present application, after coordinate information of the target object in the framing screen of the camera is determined according to step S210, a target yaw angle of the unmanned aerial vehicle and/or a target pitch angle of the gimbal are calculated according to the coordinate information and a field-of-view angle of the camera. The advantage of this setting is that it can ensure that the target object is located at a target coordinate position (i.e., the optimal position) in the current framing screen of the camera. For example, the target object is located in the center position of the current framing screen of the camera. Optionally, the target coordinate position may also be any other position in the current framing screen of the camera. The target coordinate position is not specifically limited in the present application. Those skilled in the art may set which position in the framing screen is the target coordinate position according to the actual needs.

Specifically, a method for calculating the target yaw angle of the unmanned aerial vehicle and/or the target pitch angle of the gimbal according to the coordinate information and the field-of-view angle of the camera may be as follows: firstly, the distance between the coordinate information of the target object in the framing screen and the target coordinate position is determined; and then, in combination with the field-of-view angle of the camera and a preset conversion formula, the distance is converted into a rotation angle (i.e., the target yaw angle and/or the target pitch angle) that the yaw angle of the unmanned aerial vehicle and/or the pitch angle of the gimbal need to be changed, so that the yaw angle of the unmanned aerial vehicle and/or the pitch angle of the gimbal are changed for the rotation angle, thereby putting the target object at the target coordinate position in the current framing screen of the camera.

In this embodiment of the present application, putting the target object at the target coordinate position in the framing screen of the camera may be achieved by only adjusting the yaw angle of the unmanned aerial vehicle. Therefore, the target yaw angle of the unmanned aerial vehicle needs to be calculated only according to the coordinate information and the field-of-view angle of the camera. It may be achieved by adjusting the pitch angle of the gimbal only, and then only the target pitch angle of the gimbal needs to be calculated according to the coordinate information and the field-of-view angle of the camera. It may also be achieved by simultaneously adjusting the yaw angle of the unmanned aerial vehicle and the pitch angle of the gimbal, and then the target yaw angle of the unmanned aerial vehicle and the target pitch angle of the gimbal need to be calculated according to the coordinate information and the field-of-view angle of the camera.

It is to be understood that, in a case that the setting parameter (such as focal length) of the camera is different, the field-of-view angle of the camera will also be different, and the finally calculated target yaw angle and/or target pitch angle will also be different.

In S230, the unmanned aerial vehicle is controlled to move from a current yaw angle to the target yaw angle, and/or the gimbal is controlled to move from a current pitch angle to the target pitch angle, so that the target object is adjusted from a current coordinate position to a target coordinate position in the framing screen of the camera.

The target coordinate position may be set by the user before capturing a video of the target object, or it may be a default target coordinate position (such as the center position of the framing screen).

In this embodiment of the present application, through step S220, the target object is adjusted from the current coordinate position to the target coordinate position in the framing screen of the camera. In a case that only the yaw angle of the unmanned aerial vehicle needs to be adjusted, the controller only controls the unmanned aerial vehicle to move from the current yaw angle to the target yaw angle. In a case that only the pitch angle of the gimbal needs to be adjusted, the controller only controls the gimbal to move from the current pitch angle to the target pitch angle. In a case that the yaw angle of the unmanned aerial vehicle and the pitch angle of the gimbal need to be simultaneously adjusted, the controller controls the unmanned aerial vehicle and the gimbal respectively to enable the unmanned aerial vehicle to move from the current yaw angle to the target yaw angle and the gimbal to move from the current pitch angle to the target pitch angle.

In S240, a rotation speed of the gimbal is determined according to a target flight distance of the unmanned aerial vehicle and a target rotation angle of the gimbal.

In this embodiment of the present application, the user inputs the target flight distance and the target rotation angle through a mobile terminal. After receiving the target flight distance and the target rotation angle inputted by the user, the controller calculates the rotation speed of the gimbal according to a preset calculation method. The preset calculation method in the present application may be to use a formula for calculating the rotation speed of the gimbal in the related art.

Optionally, the user may directly input the rotation speed of the gimbal through the mobile terminal, and the controller only needs to receive the rotation speed of the gimbal inputted by the user.

In S250, an initial rotation angle of the gimbal is determined according to a rotation direction and the target rotation angle of the gimbal, and the gimbal is controlled to rotate from a current rotation angle to the initial rotation angle.

In S260, the unmanned aerial vehicle is controlled to fly from a start position to an end position according to the flight direction and the target flight distance of the unmanned aerial vehicle; the gimbal is controlled to rotate from the initial rotation angle to the target rotation angle according to the rotation speed and the rotation direction of the gimbal; and the camera is controlled to capture a video of the target object.

In this embodiment of the present application, in a case that the target object does not move, a flight route of the unmanned aerial vehicle can be determined according to the flight direction and the target flight distance of the unmanned aerial vehicle, that is, the flight route does not change. In a process that the unmanned aerial vehicle flies along the flight route from the start position to the end position, the gimbal continuously rotates from the initial rotation angle to the target rotation angle according to the rotation speed and the rotation direction of the gimbal, so that the camera in the gimbal captures a video of the target object through camera rotation.

In S270, in a case that it is detected that the target object has moved, positioning information of the target object is acquired; and a new target yaw angle and/or a new target pitch angle are calculated according to the positioning information, the coordinate information, and the field-of-view angle of the camera, so that the coordinate information of the target object in the framing screen of the camera is the target coordinate position.

In this embodiment of the present application, in the process of capturing a video of the target object, in a case that the target object has moved in the video capture process, the flight route of the unmanned aerial vehicle will also be changed correspondingly.

Specifically, firstly a new target yaw angle and/or a new target pitch angle are calculated in real time according to the positioning information of the target object, the coordinate information of the target object in the framing screen of the camera, and the field-of-view angle of the camera; and then, the yaw angle of the unmanned aerial vehicle and/or the pitch angle of the gimbal are adjusted according to the new target yaw angle and/or the new target pitch angle, so that the coordinate information of the target object in the framing screen of the camera is the target coordinate position. The advantage of this setting is that no matter how the target object has moved, it can ensure that the coordinate information of the target object in the framing screen is always the target coordinate position set by the user.

The method of acquiring the positioning information of the target object has been explained and described in step S210, which will not be repeated here.

Specifically, a specific process of calculating the new target yaw angle and/or the new target pitch angle according to the positioning information, the coordinate information, and the field-of-view angle of the camera, so that the coordinate information of the target object in the framing screen of the camera is the target coordinate position may be implemented through the following two sub-steps.

In S2701, an intermediate yaw angle and/or an intermediate pitch angle are determined according to the positioning information. The unmanned aerial vehicle is controlled to be adjusted from the target yaw angle to the intermediate yaw angle, and/or the gimbal is controlled to be adjusted from the target pitch angle to the intermediate pitch angle, so that the target object is in the framing screen of the camera.

In this embodiment of the present application, the target object is put in the framing screen of the camera. In a case that only the yaw angle of the unmanned aerial vehicle needs to be adjusted, the intermediate yaw angle is determined according to the positioning information of the target object, and the unmanned aerial vehicle is controlled to be adjusted from the target yaw angle to the intermediate yaw angle. In a case that only the pitch angle of the gimbal needs to be adjusted, the intermediate pitch angle is determined according to the positioning information of the target object, and the gimbal is controlled to be adjusted from the target pitch angle to the intermediate pitch angle. In a case that the yaw angle of the unmanned aerial vehicle and the pitch angle of the gimbal need to be simultaneously adjusted, an intermediate yaw angle and an intermediate pitch angle are determined according to the positioning information, and the unmanned aerial vehicle and the gimbal are controlled respectively to make the unmanned aerial vehicle to be adjusted from the target yaw angle to the intermediate yaw angle and the gimbal to be adjusted from the target pitch angle to the intermediate pitch angle.

How to determine the intermediate yaw angle and/or the intermediate pitch angle according to the positioning information is just like the specific process of determining the yaw angle of the unmanned aerial vehicle according to the positioning information in step S210, which will not be repeated here.

In S2702, a new target yaw angle and/or a new target pitch angle are calculated according to the coordinate information and the field-of-view angle of the camera. The unmanned aerial vehicle is controlled to be adjusted from the intermediate yaw angle to the new target yaw angle, and/or the gimbal is controlled to be adjusted from the intermediate pitch angle to the new target pitch angle, so that the coordinate information of the target object in the framing screen of the camera is the target coordinate position.

In this embodiment of the present application, the target object is put at the target coordinate position in the framing screen of the camera. In a case that only the yaw angle of the unmanned aerial vehicle needs to be adjusted, a new target yaw angle is calculated according to the coordinate information and the field-of-view angle of the camera, and the unmanned aerial vehicle is controlled to be adjusted from the intermediate yaw angle to the new target yaw angle. In a case that only the pitch angle of the gimbal needs to be adjusted, a new target pitch angle is calculated according to the coordinate information and the field-of-view angle of the camera, and the gimbal is controlled to be adjusted from the intermediate pitch angle to the new target pitch angle. In a case that the yaw angle of the unmanned aerial vehicle and the pitch angle of the gimbal need to be simultaneously adjusted, a new target yaw angle and a new target pitch angle are calculated according to the coordinate information and the field-of-view angle of the camera, and the unmanned aerial vehicle and the gimbal are controlled respectively to make the unmanned aerial vehicle to be adjusted from the intermediate yaw angle to the new target yaw angle and the gimbal to be adjusted from the intermediate pitch angle to the new target pitch angle.

How to calculate the new target yaw angle and/or the new target pitch angle according to the coordinate information and the field-of-view angle of the camera is just like the specific process of calculating the target yaw angle of the unmanned aerial vehicle and/or the target pitch angle of the gimbal according to the coordinate information and the field-of-view angle of the camera in step S220, which will not be repeated here.

It is to be understood that, regardless of whether the target object has moved or not, the controller needs to acquire the positioning information of the target object in real time. The controller determines whether the target object has moved according to the positioning information of the target object. In a case that the target object has not moved, the controller does not need to change the flight route of the unmanned aerial vehicle according to the positioning information of the target object. In a case that the target object has moved, the controller change the flight route of the unmanned aerial vehicle according to the positioning information of the target object at current, that is, a new target yaw angle and/or a new target pitch angle are calculated according to the positioning information, the coordinate information, and the field-of-view angle of the camera, so that the coordinate information of the target object in the framing screen of the camera is the target coordinate position.

In the technical solution provided in this embodiment, firstly coordinate information of the target object in a framing screen of the camera is determined. Then, the target yaw angle of the unmanned aerial vehicle and/or the target pitch angle of the gimbal are calculated to control the target object to be adjusted from the current coordinate position to the target coordinate position in the framing screen of the camera. The rotation speed of the gimbal is determined according to the target flight distance and the target rotation angle. The initial rotation angle is determined according to the rotation direction and the target rotation angle of the gimbal. The unmanned aerial vehicle is controlled to fly from a start position to an end position, the gimbal is controlled to be rotated from the initial rotation angle to the target rotation angle, and the camera is controlled to capture a video of the target object. In the process of capturing a video of the target object, in a case that it is detected that the target object has moved, the positioning information of the target object is acquired, and a new target yaw angle and/or a new target pitch angle are calculated according to the positioning information, the coordinate information, and the field-of-view angle of the camera, so that the coordinate information of the target object in the framing screen of the camera is the target coordinate position. In the present application, the yaw angle of the unmanned aerial vehicle and the pitch angle of the gimbal are adjusted according to the coordinate information of the target object in the framing screen of the camera, thereby accurately adjusting the video capture angle. In addition, by adjusting the target yaw angle and/or the target pitch angle in real time, no matter how the target object has moved, it can ensure that the coordinate information of the target object in the framing screen is always the target coordinate position set by the user, thereby improving the effect of capturing a camera-rotated video.

Embodiment 3

FIG. 3 is a schematic structural diagram of a video capturing apparatus using an unmanned aerial vehicle according to an embodiment of the present application. Referring to FIG. 3, the apparatus 300 may include:

a speed determination module 310 configured to determine a rotation speed of the gimbal according to a target flight distance of the unmanned aerial vehicle and a target rotation angle of the gimbal;

an angle control module 320 configured to determine an initial rotation angle of the gimbal according to a rotation direction and the target rotation angle of the gimbal, and control the gimbal to rotate from a current rotation angle to the initial rotation angle; and a video capture control module 330 configured to capture a video of a target object from the initial rotation angle to the target rotation angle according to a flight direction and the target flight distance of the unmanned aerial vehicle, and the rotation speed and the rotation direction of the gimbal.

Further, the video capture control module 330 may be specifically configured to control the unmanned aerial vehicle to fly from a start position to an end position according to the flight direction and the target flight distance of the unmanned aerial vehicle; control the gimbal to rotate from the initial rotation angle to the target rotation angle according to the rotation speed and the rotation direction of the gimbal; and control the camera to capture a video of the target object.

Further, the video capturing apparatus using an unmanned aerial vehicle may further include a video capture angle determination module.

The video capture angle determination module is configured to, before determining the rotation speed of the gimbal according to the target flight distance of the unmanned aerial vehicle and the target rotation angle of the gimbal, determine coordinate information of the target object in a framing screen of the camera; calculate a target yaw angle of the unmanned aerial vehicle and/or a target pitch angle of the gimbal according to the coordinate information and a field-of-view angle of the camera; and control the unmanned aerial vehicle to move from a current yaw angle to the target yaw angle, and/or control the gimbal to move from a current pitch angle to the target pitch angle, so that the target object is adjusted from a current coordinate position to a target coordinate position in the framing screen of the camera.

Further, the video capturing apparatus using an unmanned aerial vehicle may further include a target tracking module. The target tracking module specifically includes a positioning information acquisition unit and a video capture angle adjustment unit.

The positioning information acquisition unit is configured to, in a case that it is detected that the target object has moved, acquire positioning information of the target object.

The video capture angle adjustment unit is configured to calculate a new target yaw angle and/or a new target pitch angle according to the positioning information, the coordinate information, and the field-of-view angle of the camera, so that the coordinate information of the target object in the framing screen of the camera is the target coordinate position.

Further, the video capture angle adjustment unit may be specifically configured to determine an intermediate yaw angle and/or an intermediate pitch angle according to the positioning information; control the unmanned aerial vehicle to be adjusted from the target yaw angle to the intermediate yaw angle, and/or control the gimbal to be adjusted from the target pitch angle to the intermediate pitch angle, so that the target object is in the framing screen of the camera; calculate the new target yaw angle and/or the new target pitch angle according to the coordinate information and the field-of-view angle of the camera; and control the unmanned aerial vehicle to be adjusted from the intermediate yaw angle to the new target yaw angle, and/or control the gimbal to be adjusted from the intermediate pitch angle to the new target pitch angle, so that the coordinate information of the target object in the framing screen of the camera is the target coordinate position.

Further, the video capturing apparatus using an unmanned aerial vehicle may further include a video capture adjustment module.

The video capture adjustment module is configured to, in a case that it is detected that the target object is lost, determine a current target yaw angle of the unmanned aerial vehicle, a current target pitch angle of the gimbal, and a position of the target object before being lost; and continuously perform an operation of capturing a video of the position of the target object before being lost from the initial rotation angle to the target rotation angle according to the flight direction and the target flight distance of the unmanned aerial vehicle, and the rotation speed and the rotation direction of the gimbal on the position of the target object before being lost according to the current target yaw angle of the unmanned aerial vehicle and the current target pitch angle of the gimbal.

Optionally, the gimbal is a four-axis gimbal.

The video capturing apparatus using an unmanned aerial vehicle provided in this embodiment is applicable to the video capturing method using an unmanned aerial vehicle provided in any of the embodiments above, and has corresponding functions and beneficial effects.

Embodiment 4

Figure 4:
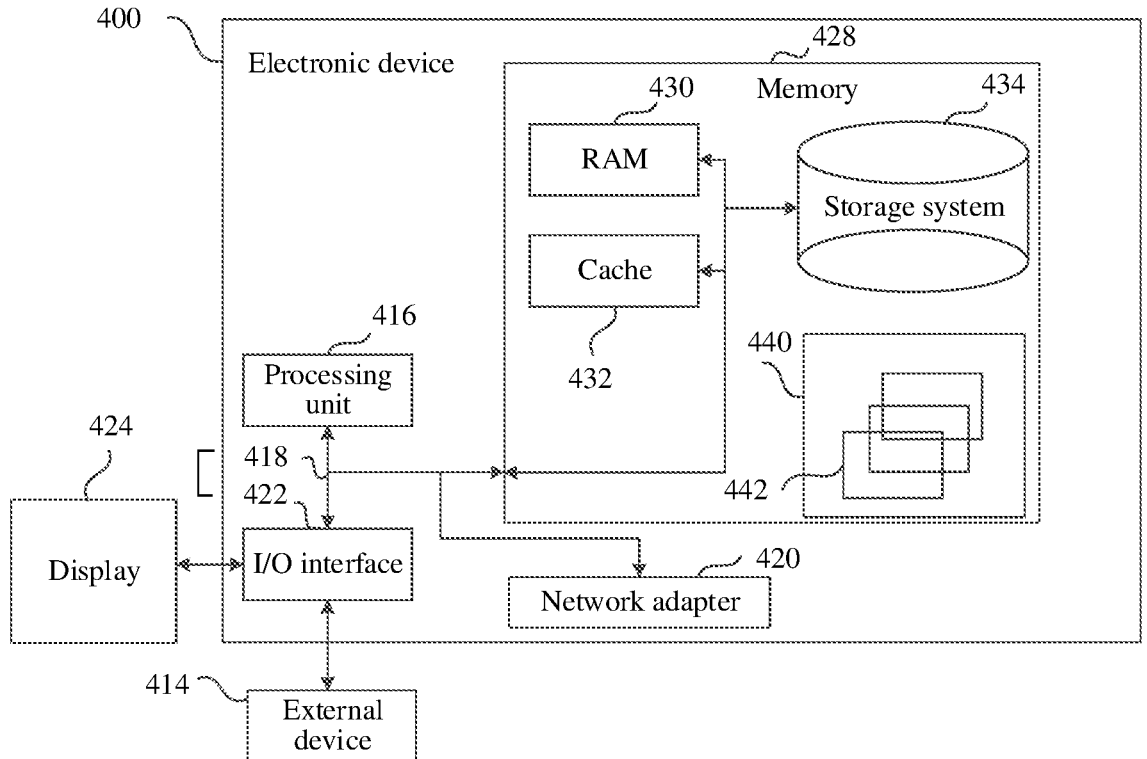
FIG. 4 is a block diagram of an electronic device for implementing a video capturing method using an unmanned aerial vehicle according to an embodiment of the present application.

FIG. 4 is a block diagram of an electronic device for implementing a video capturing method using an unmanned aerial vehicle according to an embodiment of the present application. FIG. 4 illustrates a block diagram of an exemplary electronic device for implementing an embodiment of the present application. The electronic device illustrated in FIG. 4 is merely an example, and does not constitute any limitation on functions and use ranges of this embodiment of the present application. The mobile terminal may be typically a smart phone, tablet, laptop, car terminal, and wearable device, etc. The electronic device in this embodiment of the present application may be an unmanned aerial vehicle, and the unmanned aerial vehicle may be a quadcopter.

Referring to FIG. FIG. 4, the electronic device 400 is represented in the form of a general-purpose computing device. Components of the electronic device 400 may include, but not limited to, one or more processors or processing units 416, a memory 428, and a bus 418 connecting different system components (including the memory 428 and the processing unit 416).

The bus 418 may indicate one or more of several types of bus structures, including a memory bus or memory controller, a peripheral bus, an accelerated graphics port, a processor, or a local bus using any of multiple bus structures. For example, these architectures include, but not limited to, Industry Standard Architecture (ISA) buses, Microchannel Architecture (MAC) buses, Enhanced ISA buses, Video Electronics Standards Association (VESA) local area buses, and Peripheral Component Interconnect (PCI) buses.

The electronic device 400 typically includes multiple computer-readable media. These media may be any available media that can be accessed by the electronic device 400, including volatile and non-volatile media, mobile and immobile media.

The memory 428 may include computer-readable media in the form of a volatile memory, such as a random access memory (RAM) 430 and/or a cache memory 432. The electronic device 400 may further include other mobile/immobile, volatile/non-volatile computer system storage media. As an example, the storage system 434 may be used for reading and writing immobile non-volatile magnetic media (not shown in FIG. 4, commonly referred to as "hard drivers"). Although not shown in FIG. 4, a disk driver may be provided for reading and writing a mobile non-volatile disk (such as "floppy disk"), as well as an optical disk driver for reading and writing a mobile non-volatile optical disk (such as CD-ROM, DVD-ROM, or other optical media). In these cases, each driver may be connected to the bus 418 through one or more data medium interfaces. The memory 428 may include at least one program product, which has a set (e.g., at least one) of program modules configured to execute the functions of each embodiment of the present application.

A program/utility 440 having a set of (at least one) program modules 442 may be stored in, for example, the memory 428. Such program modules 442 include, but not limited to, an operating system, one or more applications, other program modules, and program data. Each of such examples or a combination thereof may include an implementation of a network environment. The program modules 442 typically execute the functions and/or methods described in the embodiments of the present application.

The electronic device 400 may communicate with one or more external devices 414 (such as a keyboard, a pointing device or a display 424), and may also communicate with one or more devices that enable users to interact with the electronic device 400, and/or with any device that enables the electronic device 400 to communicate with one or more other computing devices (such as a network card or a modem). Such communication may be carried out through an input/output (I/O) interface 422. In addition, the electronic device 400 may further communicate with one or more networks (such as a local area network (LAN), a wide area network (WAN), and/or a public network (such as the Internet)) through a network adapter 420. Referring to FIG. 4, the network adapter 420 communicates with other modules of the electronic device 400 through the bus 418. It is to be understood that although not shown in FIG. 4, other hardware and/or software modules may be used in combination with the electronic device 400, including, but not limited to, microcode, a device driver, a redundant processing unit, an external disk drive array, a RAID system, a tape driver, a data backup storage system, and the like.

The processing unit 416 executes various functional applications and data processing by running programs stored in the memory 428, in order to, for example, implement the video capturing method using an unmanned aerial vehicle provided in any embodiment of the present application.

Embodiment 5

Embodiment 5 of the present application provides a computer-readable storage medium storing a computer program (or computer-executable instruction), which, when executed by a processor, implements the video capturing method using an unmanned aerial vehicle provided in any embodiment of the present application.

The computer storage medium in this embodiment of the present application may use one or any combination of more computer-readable media. The computer-readable medium may be a computer-readable signal medium or a computer-readable storage medium. The computer-readable storage medium may be, for example, but is not limited to, an electric, magnetic, optical, electromagnetic, infrared, or semi-conductive system, apparatus, or component, or any combination of the above. More specific examples (a non-exhaustive list) of the computer-readable storage medium include the following: an electrical connection having one or more wires, a portable computer disk, a hard disk, a Random-Access Memory (RAM), a Read-Only Memory (ROM), an Erasable Programmable Read-Only Memory (EPROM or flash memory), an optical fiber, a portable Compact Disk Read-Only Memory (CD-ROM), an optical storage device, a magnetic storage device, or any suitable combination thereof. In the present application, the computer-readable storage medium may be any tangible medium containing or storing a program, and the program may be used by or used in combination with an instruction execution system, an apparatus, or a device.

The computer-readable signal medium may include a data signal being in a baseband or transmitted as a part of a carrier, which carries a computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device.

Embodiments of the present application provide a video capturing method and apparatus using an unmanned aerial vehicle, an unmanned aerial vehicle and a storage medium, each of which involves determining a rotation speed of a gimbal according to a target flight distance of the unmanned aerial vehicle and a target rotation angle of the gimbal; determining an initial rotation angle of the gimbal according to a rotation direction and the target rotation angle of the gimbal, and controlling the gimbal to rotate from a current rotation angle to the initial rotation angle; and capturing a video of a target object from the initial rotation angle to the target rotation angle according to a flight direction and the target flight distance of the unmanned aerial vehicle, and the rotation speed and the rotation direction of the gimbal. The present application can automatically control the flight of the unmanned aerial vehicle and the rotation of the gimbal through a controller of the unmanned aerial vehicle, thereby solving the problem of manual control of the unmanned aerial vehicle and the gimbal in the related art, and reducing the difficulty in capturing a camera-rotated video. The present application can accurately control the rotation angle and the rotation speed of the gimbal, thereby accurately controlling the roll angle of the gimbal. Therefore, the present application can also improve the effect of capturing a camera-rotated video.

The program code included in the computer-readable medium may be transmitted by using any suitable medium, including but not limited to, wireless transmission, a wire, a cable, Radio Frequency (RF) or the like, or any other suitable combination thereof.

The computer program code used for executing the operations of the embodiments of the present application may be written by using one or more programming languages or a combination thereof. The programming languages include object-oriented programming languages such as Java, Smalltalk and C++, and also include conventional procedural programming languages such as "C" or similar programming languages. The program code may be completely executed on a user computer, partially executed on a user computer, executed as an independent software package, partially executed on a user computer and partially executed on a remote computer, or completely executed on a remote computer or server. For the case involving a remote computer, the remote computer may be connected to a computer of a user through any type of network including a Local Area Network (LAN) or a Wide Area Network (WAN), or may be connected to an external computer (for example, through the Internet by using an Internet service provider).

What is claimed is:

1. A video capturing method, applied to a video capturing system using an unmanned aerial vehicle, the system comprising the unmanned aerial vehicle, the unmanned aerial vehicle being provided with a gimbal, and the method comprising:

determining a rotation speed of the gimbal according to a target flight distance of the unmanned aerial vehicle and a target rotation angle of the gimbal;

17
18 determining an initial rotation angle of the gimbal according to a rotation direction and the target rotation angle of the gimbal, and controlling the gimbal to rotate from a current rotation angle to the initial rotation angle;

capturing a video of a target object from the initial rotation angle to the target rotation angle according to a flight direction and the target flight distance of the unmanned aerial vehicle, and the rotation speed and the rotation direction of the gimbal, wherein the step of capturing the video comprises using a delayed video capture function to compress a slow change process of the target object into a shorter time; and adjusting a coordinate information of the target object in the framing screen of a camera when the target object has moved, so that the coordinate information of the target object in the framing screen of the camera is the target coordinate position.

2. The video capturing method according to claim 1, wherein the camera is mounted on the gimbal in the video capturing system; and the capturing the video of a target object from the initial rotation angle to the target rotation angle according to the flight direction and the target flight distance of the unmanned aerial vehicle, and the rotation speed and the rotation direction of the gimbal comprises:

controlling the unmanned aerial vehicle to fly from a start position to an end position according to the flight direction and the target flight distance of the unmanned aerial vehicle;

controlling the gimbal to rotate from the initial rotation angle to the target rotation angle according to the rotation speed and the rotation direction of the gimbal; and controlling the camera to capture a video of the target object.

3. The video capturing method according to claim 1, wherein before the determining a rotation speed of the gimbal according to a target flight distance of the unmanned aerial vehicle and a target rotation angle of the gimbal, the method further comprises:

determining coordinate information of the target object in a framing screen of the camera;

calculating a target yaw angle of the unmanned aerial vehicle and a target pitch angle of the gimbal according to the coordinate information and a field-of-view angle of the camera; and controlling the unmanned aerial vehicle to move from a current yaw angle to the target yaw angle, and controlling the gimbal to move from a current pitch angle to the target pitch angle, so that the target object is adjusted from a current coordinate position to a target coordinate position in the framing screen of the camera.

4. The video capturing method according to claim 3, wherein the method further comprises:

acquiring positioning information of the target object, when it is detected that the target object has moved; and calculating a new attitude angle according to the positioning information, the coordinate information, and the field-of-view angle of the camera, so that the coordinate information of the target object in the framing screen of the camera is the target coordinate position.

5. The video capturing method according to claim 4, wherein the calculating a new attitude angle according to the positioning information, the coordinate information, and the field-of-view angle of the camera, so that the coordinate information of the target object in the framing screen of the camera is the target coordinate position comprises:

determining an intermediate attitude angle according to the positioning information;

controlling the unmanned aerial vehicle to be adjusted from the target yaw angle to the intermediate yaw angle, and controlling the gimbal to be adjusted from the target pitch angle to the intermediate pitch angle, so that the target object is in the framing screen of the camera;

calculating the new attitude angle according to the coordinate information and the field-of-view angle of the camera; and controlling the unmanned aerial vehicle to be adjusted from the intermediate yaw angle to the new target yaw angle, and controlling the gimbal to be adjusted from the intermediate pitch angle to the new target pitch angle, so that the coordinate information of the target object in the framing screen of the camera is the target coordinate position.

6. The video capturing method according to claim 4, wherein the calculating a new attitude angle according to the positioning information, the coordinate information, and the field-of-view angle of the camera, so that the coordinate information of the target object in the framing screen of the camera is the target coordinate position comprises:

determining an intermediate attitude angle according to the positioning information;

controlling the unmanned aerial vehicle to be adjusted from the target yaw angle to the intermediate yaw angle, so that the target object is in the framing screen of the camera;

calculating the new attitude angle according to the coordinate information and the field-of-view angle of the camera; and controlling the unmanned aerial vehicle to be adjusted from the intermediate yaw angle to the new target yaw angle, so that the coordinate information of the target object in the framing screen of the camera is the target coordinate position.

7. The video capturing method according to claim 4, wherein the calculating a new attitude angle according to the positioning information, the coordinate information, and the field-of-view angle of the camera, so that the coordinate information of the target object in the framing screen of the camera is the target coordinate position comprises:

determining an intermediate attitude angle according to the positioning information;

controlling the gimbal to be adjusted from the target pitch angle to the intermediate pitch angle, so that the target object is in the framing screen of the camera;

calculating the new attitude angle according to the coordinate information and the field-of-view angle of the camera; and controlling the gimbal to be adjusted from the intermediate pitch angle to the new target pitch angle, so that the coordinate information of the target object in the framing screen of the camera is the target coordinate position.

8. The video capturing method according to claim 1, wherein the method further comprises:

determining a current target yaw angle of the unmanned aerial vehicle, a current target pitch angle of the gimbal, and a position of the target object before being lost when the target object is lost; and continuously performing an operation of capturing a video of the position of the target object before being lost from the initial rotation angle to the target rotation angle according to the flight direction and the target flight distance of the unmanned aerial vehicle, and the rotation speed and the rotation direction of the gimbal on the position of the target object before being lost according to the current target yaw angle of the unmanned aerial vehicle and the current target pitch angle of the gimbal.

9. The video capturing method according to claim 1, wherein the gimbal is a four-axis gimbal.

10. A video capturing apparatus integrated into a video capturing system using an unmanned aerial vehicle, the system comprising the unmanned aerial vehicle, the unmanned aerial vehicle being provided with a gimbal, and the apparatus comprising:

a speed determination module configured to determine a rotation speed of the gimbal according to a target flight distance of the unmanned aerial vehicle and a target rotation angle of the gimbal;

an angle control module configured to determine an initial rotation angle of the gimbal according to a rotation direction and the target rotation angle of the gimbal, and control the gimbal to rotate from a current rotation angle to the initial rotation angle; and a video capture control module configured to capture a video of a target object from the initial rotation angle to the target rotation angle according to a flight direction and the target flight distance of the unmanned aerial vehicle, and the rotation speed and the rotation direction of the gimbal, adjust a coordinate information of the target object in the framing screen of a camera when the target object has moved, so that the coordinate information of the target object in the framing screen of the camera is the target coordinate position, wherein the video capture control module comprises a delayed video capture function to compress a slow change process of the target object into a shorter time.

11. An unmanned aerial vehicle, comprising:

the unmanned aerial vehicle being provided with a gimbal, the camera is mounted on the gimbal at least one processor; and a memory device configured to store at least one program, at least one program, when executed by the processor, causing the processor to implement the video capturing method; wherein the video capturing method comprises:

determining a rotation speed of the gimbal according to a target flight distance of the unmanned aerial vehicle and a target rotation angle of the gimbal;

determining an initial rotation angle of the gimbal according to a rotation direction and the target rotation angle of the gimbal, and controlling the gimbal to rotate from a current rotation angle to the initial rotation angle; and capturing a video of a target object from the initial rotation angle to the target rotation angle according to a flight direction and the target flight distance of the unmanned aerial vehicle, and the rotation speed and the rotation direction of the gimbal, wherein the step of capturing the video comprises using a delayed video capture function to compress a slow change process of the target object into a shorter time; and adjusting a coordinate information of the target object in the framing screen of a camera when the target object has moved, so that the coordinate information of the target object in the framing screen of the camera is the target coordinate position.

12. The unmanned aerial vehicle according to claim 11, wherein the camera is mounted on the gimbal in the video capturing system; and the capturing the video of a target object from the initial rotation angle to the target rotation angle according to the flight direction and the target flight distance of the unmanned aerial vehicle, and the rotation speed and the rotation direction of the gimbal comprises:

controlling the unmanned aerial vehicle to fly from a start position to an end position according to the flight direction and the target flight distance of the unmanned aerial vehicle;

controlling the gimbal to rotate from the initial rotation angle to the target rotation angle according to the rotation speed and the rotation direction of the gimbal; and controlling the camera to capture a video of the target object.

13. The unmanned aerial vehicle according to claim 11, wherein before the determining a rotation speed of the gimbal according to a target flight distance of the unmanned aerial vehicle and a target rotation angle of the gimbal, the video capturing method further comprises:

determining coordinate information of the target object in a framing screen of the camera;

calculating a target yaw angle of the unmanned aerial vehicle and a target pitch angle of the gimbal according to the coordinate information and a field-of-view angle of the camera; and controlling the unmanned aerial vehicle to move from a current yaw angle to the target yaw angle, and controlling the gimbal to move from a current pitch angle to the target pitch angle, so that the target object is adjusted from a current coordinate position to a target coordinate position in the framing screen of the camera.

14. The unmanned aerial vehicle according to claim 13, wherein the video capturing method further comprises:

acquiring positioning information of the target object, when it is detected that the target object has moved; and calculating a new attitude angle according to the positioning information, the coordinate information, and the field-of-view angle of the camera, so that the coordinate information of the target object in the framing screen of the camera is the target coordinate position.

15. The unmanned aerial vehicle according to claim 14, wherein the calculating a new attitude angle according to the positioning information, the coordinate information, and the field-of-view angle of the camera, so that the coordinate information of the target object in the framing screen of the camera is the target coordinate position comprises:

determining an intermediate attitude angle according to the positioning information;

controlling the unmanned aerial vehicle to be adjusted from the target yaw angle to the intermediate yaw angle, and controlling the gimbal to be adjusted from the target pitch angle to the intermediate pitch angle, so that the target object is in the framing screen of the camera;

calculating the new attitude angle according to the coordinate information and the field-of-view angle of the camera; and controlling the unmanned aerial vehicle to be adjusted from the intermediate yaw angle to the new target yaw angle, and controlling the gimbal to be adjusted from the intermediate pitch angle to the new target pitch angle, so that the coordinate information of the target object in the framing screen of the camera is the target coordinate position.

16. The unmanned aerial vehicle according to claim 14, wherein the calculating a new attitude angle according to the positioning information, the coordinate information, and the field-of-view angle of the camera, so that the coordinate information of the target object in the framing screen of the camera is the target coordinate position comprises:

determining an intermediate attitude angle according to the positioning information;

controlling the unmanned aerial vehicle to be adjusted from the target yaw angle to the intermediate yaw angle, so that the target object is in the framing screen of the camera;

calculating the new target yaw angle and/or the new target pitch angle according to the coordinate information and the field-of-view angle of the camera; and controlling the unmanned aerial vehicle to be adjusted from the intermediate yaw angle to the new target yaw angle, so that the coordinate information of the target object in the framing screen of the camera is the target coordinate position.

17. The unmanned aerial vehicle according to claim 14, wherein the calculating a new attitude angle according to the positioning information, the coordinate information, and the field-of-view angle of the camera, so that the coordinate information of the target object in the framing screen of the camera is the target coordinate position comprises:

determining an intermediate attitude angle according to the positioning information;

controlling the gimbal to be adjusted from the target pitch angle to the intermediate pitch angle, so that the target object is in the framing screen of the camera;

calculating the new target yaw angle and/or the new target pitch angle according to the coordinate information and the field-of-view angle of the camera; and controlling the gimbal to be adjusted from the intermediate pitch angle to the new target pitch angle, so that the coordinate information of the target object in the framing screen of the camera is the target coordinate position.

18. The unmanned aerial vehicle according to claim 11, wherein the video capturing method further comprises:

determining a current target yaw angle of the unmanned aerial vehicle, a current target pitch angle of the gimbal, and a position of the target object before being lost when the target object is lost; and continuously performing an operation of capturing a video of the position of the target object before being lost from the initial rotation angle to the target rotation angle according to the flight direction and the target flight distance of the unmanned aerial vehicle, and the rotation speed and the rotation direction of the gimbal on the position of the target object before being lost according to the current target yaw angle of the unmanned aerial vehicle and the current target pitch angle of the gimbal.

19. The unmanned aerial vehicle according to claim 11, wherein the gimbal is a four-axis gimbal.

20. The unmanned aerial vehicle according to claim 11, wherein the attitude angle comprises a yaw angle of the unmanned aerial vehicle, and a pitch angle of the gimbal.

* * * * *